Oct. 23, 1928. 1,688,869
H. M. LAMBERT
METHOD OF MANUFACTURING TIRES
Filed Oct. 13, 1922
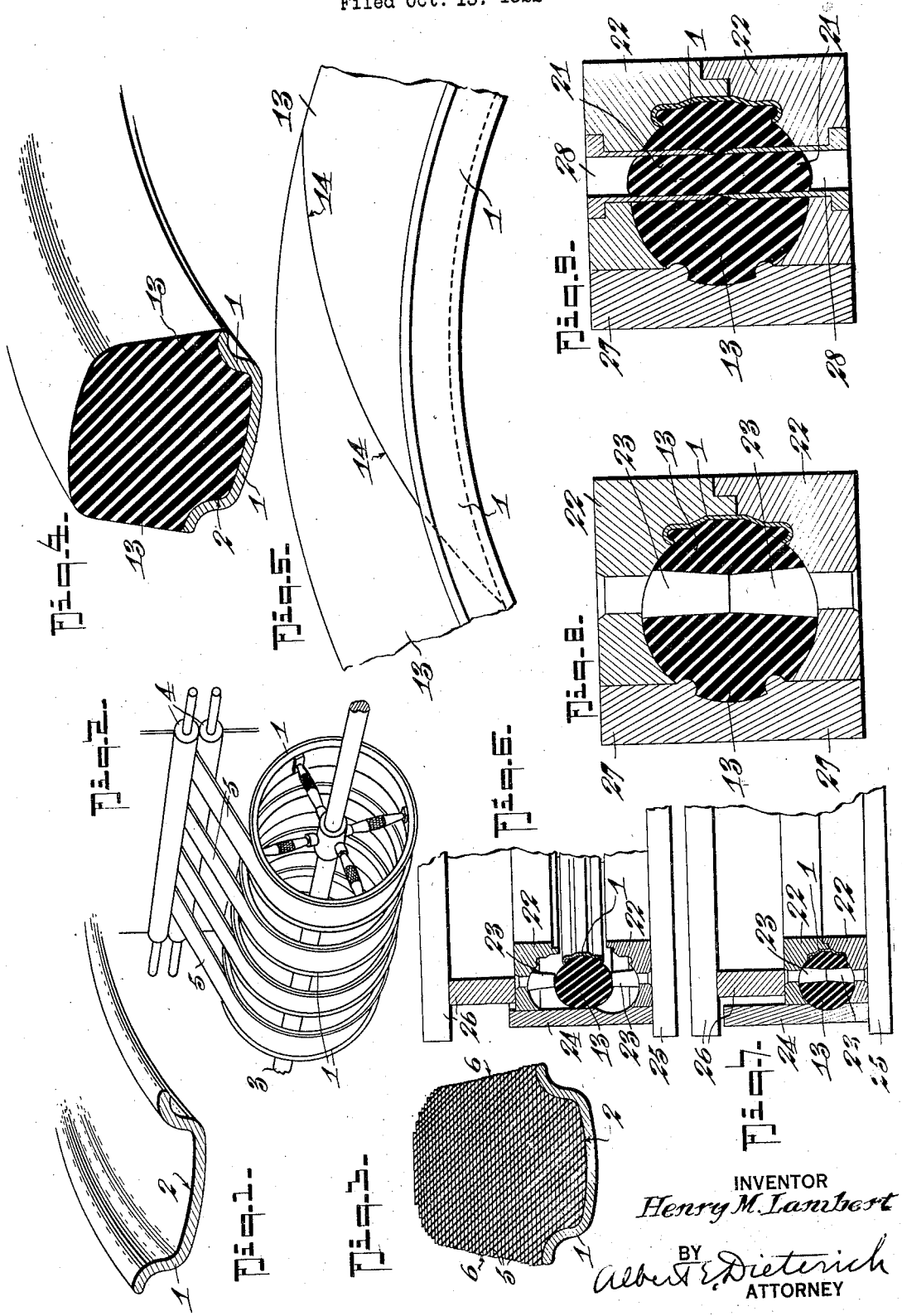
INVENTOR
Henry M. Lambert
BY Albert E. Dieterich
ATTORNEY Patented Oct. 23, 1928.

1,688,869

UNITED STATES PATENT OFFICE.

HENRY M. LAMBERT, OF PORTLAND, OREGON, ASSIGNOR TO LAMBERT TIRE & RUBBER CO., OF BARBERTON, OHIO, A CORPORATION OF ARIZONA.

METHOD OF MANUFACTURING TIRES.

Application filed October 13, 1922. Serial No. 594,301.

This invention relates to the art of tire building and more especially to the art of manufacturing cushion tires of the ventilated type, i. e. the type having apertures or holes in the carcass in communication with the atmosphere.

Heretofore it has been the general practice to build up tires of this character in molds by winding the tire material around a rim, and building up the carcass on the tire base which fills the rim, such method for instance as is disclosed in my Patent No. 1,351,856, issued September 7, 1920.

The present invention has for its object to reduce the labor cost of manufacturing tires by the elimination of certain steps in the assembling of the rubber that constitutes the tire carcass.

In its generic nature, the present invention resides in building up a tire carcass on a rim either by placing the rim in a mold or between guide plates and winding the carcass material around the rim in the mold, or preferably, by taking the rubber and passing it between calendering rolls to form it into strips and as it passes between the calendering rolls, winding it immediately on the rim to form the tire carcass of the desired thickness and thereafter confining the tire carcass so wound in a mold or chamber and punching, the ventilated holes into the carcass and maintaining them during vulcanization so as to leave, in the finished tire, holes or depressions in the carcass as may be desired, it being of course understood that the carcass is vulcanized to retain its shape and dimensions.

In its more specific nature, the invention resides in those novel steps of manipulation and operation which will be hereinafter fully described, then be specifically pointed out in the appended claims, reference being had to the accompanying drawings, in which several embodiments of the invention are illustrated and in which:

Figure 1 is a detail sectional perspective view of a portion of a rim on which the tire is to be built up, the rim, of course, being of any standard make.

Figure 2 is a diagrammatic view showing how the tire carcass is built up by winding the rubber strips from the calendering rolls directly on the rims.

Figure 3 is a cross sectional view of a tire carcass and rim ready to be put into the restraining mold and have the apertures punched in the same.

Figure 4 is a sectional perspective view of a portion of a die-expressed tire carcass, showing the same on a rim.

Figure 5 is a detail side elevation of the same on the rim and showing the lapped ends.

Figure 6 is a detail cross section of a punching mold which may be employed in connection with my process and in which the punching and enclosing of the carcass in a mold occurs simultaneously.

Figure 7 is a view similar to Figure 6 with the mold halves brought together.

Figure 8 is a view similar to Figure 7 with the temporary tread ring removed and the regular tread ring of the mold put into place ready for the mold to be put into the vulcanizing kettle.

Figure 9 is a view of a mold similar to that shown in Figures 6 to 8, inclusive, but in which the core pins are hollow tubular knives so as to cut through the tire carcass.

In the drawings, which illustrate several modifications or embodiments of my method, like numerals of reference indicate like parts in all of the figures. In carrying out my method of manufacturing tires I take a suitable rim 1 having its surface 2 plated with brass or some other suitable material having an affinity for rubber and place a series of rims on expanding mandrels 3 and wind strips of rubber 5 from the calendering rolls 4 to build up the tire carcass to the required thickness, it being understood, of course, that the width of the strips 5 are adjusted by suitable means on the calendering machine so as to produce a strip of the required width in the particular place where it is to be wound. After the tire carcass has been built up (see Figure 2) it may be trimmed along the sides 6 to the approximate shape desired.

Instead of building up the tire carcass of laminated rubber sheets as shown in Figure 3, the carcass 13 may be die-expressed in one piece and of the required cross sectional form and size to fit on the rim 1, in which event the die-expressed material is wound along the rim in one loop with its ends cut to form a lap joint 14, see Figure 4. The carcass is then placed in a vulcanizing mold, see Figure 6, and the holes punched in.

The tire carcass built up either by the laminated or by the die-expressed method above described is then placed between the halves 22 of a vulcanizing mold, provided with a false periphery 24 and placing the mold, as shown in Figure 6, between the beds 25 and 26 of a hydraulic press, pressing the mold halves together, as in Figure 7, and thereby forming the holes in the tire carcass and squeezing the tire to completely fill the mold cavity (see Figure 7); after which the false periphery 24 is removed and the natural periphery 27, or component part of the vulcanizing mold, is put into place and the mold parts clamped together in the usual way, (see Figure 8) after which the mold is placed in the vulcanizing kettle and vulcanized in the usual way. In this embodiment of my invention the mold pins 23 are rigidly fastened to the mold halves 22 and preferably tapered in form.

Instead of punching the holes by displacing the rubber of the carcass through the use of solid end punches I may use tubular punches or knives 28, see Figure 8, and operate the mold halves in the manner shown in Figures 6 and 7. After bringing the mold halves together the cores 21, cut out by the tubular punches or knives 28, are rammed out of the knives before putting the molds into the vulcanizing kettle.

The essential or underlying feature of my method resides in first, building up the tire in a solid state, and then while confining it within predetermined bounds, punch the holes through the tire carcass before vulcanizing the same.

From the foregoing description, taken in connection with the accompanying drawings, it is thought that my method with its various adaptations will be clear to those skilled in the art.

What I claim is:

The method of manufacturing cushion tires which consists in building up on a rim, a solid carcass body of approximately the outline or form of but of lesser cross sectional area than the desired tire, placing it between punching mold halves, said mold halves having portions forming a tire molding cavity of the desired size and having punching elements, bringing the mold halves with their punching elements together to enclose the rim and tire carcass and simultaneously punch holes in the same, and displacing the carcass material punched to fill the mold cavity, and subsequently vulcanizing the mass while in the mold and thereafter removing the mold halves from the mass so vulcanized.

HENRY M. LAMBERT.